United States Patent [19]

Ackerman

[11] Patent Number: 5,096,545

[45] Date of Patent: Mar. 17, 1992

[54] PLUTONIUM RECOVERY FROM SPENT REACTOR FUEL BY URANIUM DISPLACEMENT

[75] Inventor: John P. Ackerman, Downers Grove, Ill.

[73] Assignee: The United States of America as represented by the United States Department of Energy, Washington, D.C.

[21] Appl. No.: 703,641

[22] Filed: May 21, 1991

[51] Int. Cl.$^5$ .............................................. C25C 3/34
[52] U.S. Cl. .................................. 204/1.5; 252/627;
  75/394; 75/396; 75/398; 423/250; 423/251;
  423/253; 423/257; 423/263; 423/5
[58] Field of Search .................. 204/1.5; 252/626, 627;
  423/5, 257, 253, 250, 251, 263; 75/394, 396, 398

[56] References Cited

U.S. PATENT DOCUMENTS

| | | | |
|---|---|---|---|
| 3,063,830 | 11/1962 | Martin et al. | 75/396 |
| 3,154,379 | 10/1964 | Benedict et al. | 423/5 |
| 3,213,002 | 10/1965 | Benedict et al. | 204/1.5 |
| 3,282,681 | 11/1966 | Knighton et al. | 75/396 |
| 3,326,673 | 6/1967 | Knighton et al. | 75/396 |
| 3,460,917 | 8/1969 | Long | 75/396 |
| 4,814,046 | 3/1989 | Johnson et al. | 204/1.5 |
| 4,880,506 | 11/1989 | Ackerman et al. | 204/1.5 |
| 5,009,752 | 4/1991 | Tomczuk et al. | 204/64 R |

Primary Examiner—Brooks H. Hunt
Assistant Examiner—Ngoclan T. Mai
Attorney, Agent, or Firm—James W. Weinberger; Thomas G. Anderson; William R. Moser

[57] ABSTRACT

A process for separating uranium values and transuranic values from fission products containing rare earth values when the values are contained together in a molten chloride salt electrolyte. A molten chloride salt electrolyte with a first ratio of plutonium chloride to uranium chloride is contacted with both a solid cathode and an anode having values of uranium and fission products including plutonium. A voltage is applied across the anode and cathode electrolytically to transfer uranium and plutonium from the anode to the electrolyte while uranium values in the electrolyte electrolytically deposit as uranium metal on the solid cathode in an amount equal to the uranium and plutonium transferred from the anode causing the electrolyte to have a second ratio of plutonium chloride to uranium chloride. Then the solid cathode with the uranium metal deposited thereon is removed and molten cadmium having uranium dissolved therein is brought into contact with the electrolyte resulting in chemical transfer of plutonium values from the electrolyte to the molten cadmium and transfer of uranium values from the molten cadmium to the electrolyte until the first ratio of plutonium chloride to uranium chloride is reestablished.

20 Claims, No Drawings

PLUTONIUM RECOVERY FROM SPENT REACTOR FUEL BY URANIUM DISPLACEMENT

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a pyrometallurgical reprocessing of irradiated nuclear reactor fuel elements to recover purified uranium and a mixture of uranium and plutonium for use as a fresh blanket and core in a nuclear reactor. More particularly, this invention relates to a process for refining spent blanket and core fuel in a single electrorefining cell by dissolving uranium and plutonium from the spent fuel in a molten chloride salt and thereafter selectively electrolytically removing first uranium and then thereafter using molten cadmium having uranium values dissolved therein chemically to displace plutonium values from molten salt and replace those values with uranium to reestablish the original salt composition.

The disposal of radioactive waste which results from the reprocessing of irradiated nuclear power reactor fuel elements is one of the major problems facing the nuclear power industry. One approach is to solidify the radioactive waste as it comes from the reprocessing facility into a stable solid material which can be stored in the earth for a period of time sufficient for the radiation to decay to acceptable levels. However, storage times required for spent reactor fuels to achieve such levels of radioactivity are on the order of a million years. This is far longer than the geologic stability of a waste repository can be expected to be maintained. One solution is to remove the extremely long lived radioactive components such as the transuranic elements of neptunium, plutonium, americium and curium from the waste so that the remaining radioactive elements, representing the bulk of the radioactive waste, need only be stored for up to about one thousand years for the radioactivity to decay to radioactive levels of uranium used in making original fuel. It is acceptable to ensure the integrity of a repository for one thousand years. The actinides thus recovered from the waste can then be reprocessed and recycled to provide additional fuel for nuclear reactors and for isotopic power sources.

As used herein, the phrase "rare earth fission product values" includes yttrium and the lanthanide fission product elements while the phrase, "transuranic values" or TRU elements include neptunium, plutonium, americium and curium values.

Molten cadmium cathodes in combination with chloride salts have been used in processing spent fuel elements from the Integral Fast Reactor (IFR) as reported in U.S. Pat. No. 4,880,506 issued Nov. 14, 1989 to Ackerman et al. and assigned to the assignee of the present application, the disclosure of which is herein incorporated by reference.

The IFR concept is a complete, self-contained, sodium-cooled, fast reactor filled with a metallic alloy of uranium, plutonium and zirconium, and equipped with a close-coupled fuel cycle. Close-coupling of the reactor and the fuel cycle facility is achieved by locating the reactor and the reprocessing, fuel refabrication, and management efficient product waste on one site. With this arrangement, it is unnecessary to ship fuel to or from the reactor site. Fission products may be processed and stored on site for long periods of time, perhaps the entire life of the reactor, before shipment to a waste repository where ultimate disposal is required. Accordingly, it is clear that reducing the volume of waste product produced for each reprocessing is inherent in and required by the IFR concept.

A pyrometallurgical process utilizing electrorefining for purification of the core fuel has been developed to reprocess the reactor fuel. In this process, the chopped fuel rods are dissolved, or transferred by anodic solution to a solid cathode and thereafter molten cadmium is used chemically to transfer plutonium from the salt to the cadmium and replace the plutonium in the salt with uranium. The apparatus disclosed in the '506 and U.S. pat. No. 4,814,046 patents may be used to accomplish part of the process of the present invention.

In general, a low carbon steel container may be used to hold the chopped up fuel spent fuel elements or rods and a low carbon steel cathode may be used on which to deposit uranium, as will be disclosed. Subsequent to the electrotransport of the spent fuel through the electrolyte, a quantity of molten cadmium having uranium values dissolved therein is put in contact with the electrolyte so that uranium dissolved in the cadmium replaces plutonium dissolved in the salt by chemical transport. The overall result is that the uranium and plutonium values in the spent fuel are transferred electrochemically and chemically to the molten cadmium with the salt eventually regaining composition it had before the onset of the electrochemical transfer of uranium and plutonium from the anode into the salt. Thus, repeated batches of spent fuel elements can be treated without substantially altering the salt composition. During the hereinafter described process, rare earth values tend to remain in the salt and build up in concentration whereas uranium and transuranic values transfer to the electrodes.

It is known in the art how to remove the rare earth values which build up in the chloride electrolyte with reducing agents such as lithium cadmium alloys or lithium-cadmium-potassium alloys in order to isolate the rare earths in a metal matrix, all as previously disclosed in the Johnson et al. U.S. Pat. No. 4,814,046.

SUMMARY OF THE INVENTION

An improved method or process for treating IFR spent fuel has been discovered which involves combining both electrical transport and chemical replacement in a single process to permit repeated processing of batches of spent fuel elements using the same molten chloride bath.

It is therefore an object of the invention to provide a combination electrochemical and chemical process for the treatment of spent nuclear reactor fuel.

Another object of the invention is to provide a process for treating repeated batches of IFR spent fuel with substantially the same salt electrolyte.

Yet another object of the invention is to provide a process for recovering uranium and transuranic values from spent nuclear fuel in which the processing media including the chloride salt and cadmium solvent may be recovered and reused for successive batches of spent fuel.

Yet another object is to provide a process for separating uranium values and transuranic values from fission products containing rare earth values when the values are contained together in a molten chloride salt electrolyte comprising providing a molten salt electrolyte having a first ratio of plutonium chloride to uranium chloride, contacting the molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode causing the electrolyte to have a second ratio of plutonium chloride to uranium chloride, removing the solid cathode with the uranium metal deposited thereon and establishing chemical communication between the electrolyte having the second ratio and molten cadmium having uranium dissolved therein, and transferring plutonium values from the electrolyte to the molten cadmium and transferring uranium values from the molten cadmium to the electrolyte.

Yet another object of the invention is to provide a process for separating uranium values and transuranic values from fission products containing rare earth values when the values are contained together in a molten chloride salt electrolyte comprising providing a molten salt electrolyte having a first ratio of plutonium chloride to uranium chloride, contacting the molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode in an amount equal to the uranium and plutonium transferred from the anode causing the electrolyte to have a second ratio of plutonium chloride to uranium chloride, removing the solid cathode with the uranium metal deposited thereon and substituting therefor molten cadmium having uranium dissolved therein, and chemically transferring plutonium values from the electrolyte to the molten cadmium and transferring uranium values from the molten cadmium to the electrolyte until the first ratio of plutonium chloride to uranium chloride is reestablished.

A final object of the invention is to provide a process for separating uranium values and transuranic values from repeated batches of fission products containing rare earth values when said values are contained together in a molten chloride salt electrolyte comprising providing a molten salt electrolyte having a first ratio of plutonium chloride to uranium chloride, contacting the molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode in an amount equal to the uranium and plutonium transferred from the anode causing the electrolyte to have a second ratio of plutonium chloride to uranium chloride larger than the first ratio, removing the solid cathode with the uranium metal deposited thereon and dissolving some of the uranium metal in molten cadmium, contacting the molten cadmium with uranium values dissolved therein with the molten salt electrolyte having the second ratio, and chemically transferring plutonium values from the electrolyte to the molten cadmium and transferring uranium values from the molten cadmium to the electrolyte until the first ratio of plutonium chloride to uranium chloride is reestablished.

The invention consists of certain novel features and a combination of parts hereinafter fully described, and particularly pointed out in the appended claims, it being understood that various changes in the details may be made without departing from the spirit, or sacrificing any of the advantages of the present invention.

DETAILED DESCRIPTION OF THE INVENTION

These and other objects of the invention for recovering uranium and transuranic values from spent fuel elements and separating those values from rare earth fission product values when these values are contained together in a fused chloride salt may be met by first electrolytically transferring the values from the metal state into the electrolyte salt and thereafter chemically transferring uranium values for plutonium values with a molten cadmium solution.

The fused salt useful herein is a mixture of alkali metal or alkaline earth metal chlorides, except beryllium and magnesium, that has a low melting temperature and in which chlorides of the rare earth fission products and the transuranic elements have high solubilities. The salt is a mixture of one or more chlorides of lithium, sodium, potassium, calcium, strontium and barium that are thermodynamically more stable than the rare earth and actinide chlorides. For example, a salt consisting of about 23 weight percent lithium chloride, about 35 weight percent barium chloride, about 32 weight percent calcium chloride and about 10 weight percent sodium chloride and a eutectic mixture of 56% potassium chloride and 44 weight percent lithium chloride have been found to be satisfactory. However, any number of different combinations of chloride salts meeting the above criteria will be satisfactory and may be substituted one for the other without serious deleterious consequences.

The amount of molten cadmium used in the chemical transfer of uranium values therein for plutonium values present in the electrolyte depends upon the amount of uranium which needs to be transferred back to the salt. The solubility of uranium in cadmium depends upon the temperature of the molten cadmium metal. For example, at 500° C., cadmium is saturated with about 2.3 weight percent uranium. Accordingly, depending upon the amount of uranium required to be dissolved in the molten cadmium, more or less cadmium will be required, it being within the skill of the art to determine the total weight of cadmium required to dissolve the necessary amount of uranium for the chemical transfer portion of the invention process. The temperature at which the entire process operates must be at least above the melting temperature of the cadmium and the salt and below the temperature at which the components begin to vaporize, except for the cadmium distillation step which requires a temperature in excess of the boiling point of cadmium at the pressure used. The temperature of the electrochemical portion of the process may vary from about 450° C., depending upon salt composition, to about 550° C. Generally, a temperature of about 500° C. has been found to be satisfactory both for the electrotransport portion and the chemical transport portion of the subject invention. The cadmium distillation, on the other hand, would require temperatures in excess of about 1040°K or about 767° C. when the distillation is carried out at one atmosphere, but when vacuum conditions are employed such as 5 mm Hg, then the temperature can be about 400° C. As is understood by those skilled in the art, since the boiling point of uranium is about 4,407°K and that of plutonium about 3500°K, cadmium is easily distilled from a solution of cadmium with plutonium and uranium values dissolved therein. As hereinbefore stated, a principal object of the invention is to provide a method of harvesting the uranium and transuranic values from spent fuel elements while conserving the chemicals used in the process so that the amount of waste chemicals produced is small and the amount of new chemicals required for processing is likewise small.

For a feedstock containing 15.6 kilograms of uranium and 4.4 kilograms of plutonium, 390 kilograms of lithium-chloride-potassium chloride eutectic has been determined to be satisfactory based on smaller scale studies. The 390 kilograms of eutectic salt contain 21.5 kilograms of plutonium and 11.6 kilograms of uranium. With an anode of spent fuel and a solid cathode of low carbon steel, uranium can be electrolytically deposited on the cathode by impressing a voltage across the anode and the cathode. The electrochemical cell is run until about 20 kilograms of uranium are deposited on the solid electrode at which time the feedstock of uranium and plutonium has been depleted and the salt now contains 25.9 kilograms of plutonium and 7.2 kilograms of uranium. Thereafter, 300 kilograms of cadmium are heated to approximately 500° C. and 6.6 kilograms of 20 kilograms uranium deposited on the solid cathode are dissolved in the molten cadmium.

The molten cadmium with the 6.6 kilograms of uranium dissolved therein is then put in contact with the electrolyte containing the 25.9 kilograms of plutonium and 7.2 kilograms of uranium at which time the uranium in the molten cadmium displaces plutonium in the salt until the original salt composition is reestablished. 2.2 kilograms of uranium remain dissolved in the cadmium and 4.4 kilograms of plutonium have transferred from the electrolyte to the molten cadmium. At this time, the original salt composition of 390 kilograms of lithium chloride, potassium chloride eutectic having 21.5 kilograms of plutonium and 11.6 kilograms of uranium has been reestablished. Thereafter, the 2.2 kilograms of uranium and the 4.4 kilograms of plutonium are separated from the molten cadmium by elevating the temperature of cadmium above its boiling point and distilling the cadmium from the solution leaving the uranium and plutonium values.

The ratio of plutonium chloride to uranium chloride prior to uranium displacement controls the ratio of plutonium to uranium in the mixed product. Because the former ratio depends only on the amounts of uranium chloride and plutonium chloride in the electrolyte before introduction of a fuel batch and the amount of uranium and plutonium in the fuel, it is not subject to control, provided that uranium in the amount of all the actinide values in the fuel is transferred to the solid electrode. The amount of plutonium chloride and uranium chloride in the electrolyte before introduction of the feed is established before the first batch of mixed uranium-plutonium product is processed. For stable process operation, the salt composition should return to the original value after processing of each feed batch. In order to achieve this steady state composition, it is only necessary to remove as much uranium and as much plutonium as introduced with the feed batch. Constancy of the uranium chloride/plutonium chloride ratio requires that the amount of plutonium or uranium removed from any batch be equal to the amount of plutonium or uranium introduced from the feed for that batch. This will naturally occur if the salt composition is correct to begin with. There is enough uranium chloride and plutonium chloride in the electrolyte at the beginning of each process that removal of the exact amount is not critical. If the average plutonium and uranium concentrations in the feed are well known, the process will average out differences of about 10 percent in batch compositions without any operator adjustment of the amount of uranium in the chemical displacement step. If the electrotransport portion of the invention method is carried to completion and the uranium from the displacement step is removed from the uranium recovered in the electrode transport step, the total amount of uranium and plutonium removed is constrained to be exactly the amount put in. The effect of minor errors in the salt composition is not great and tends to be averaged out over several batches.

It is not possible with a fuel batch having 20 kilograms of actinides to use more than 20 kilograms of uranium in the displacement step without an additional uranium supply. On the other hand, it is required to use more uranium than the amount of plutonium to be removed. The ratio of plutonium to uranium in the mixed product can be varied over a considerable range, depending on the amount of uranium used for displacement. Typically, a 2/1 ratio of plutonium to uranium in the product is preferred and the amount of uranium in the displacement step becomes 1.5 times the amount of plutonium in the feed.

For a given amount of uranium in the displacement step, there is one and only one ratio of $PuCl_3/UCl_3$ in the salt that will result in the desired plutonium removal. The required initial ratio (which is the same ratio that should be achieved after each batch) can be calculated from the equilibrium partition coefficient by assuming the desired amount of plutonium removed and the desired $PuCl_3/UCl_3$ ratio. The partition expression is:

$$\frac{[PuCl_3][U]}{[UCl_3][PU]} = 1.8$$

Using the desired Pu/U ratio and amount of plutonium in the product, we calculate the required $PuCl_3/UCl_3$ ratio in the intermediate step:

$$\frac{PuCl_3}{UCl_3} \cdot \frac{2.2}{4.4} = 1.8 \ PuCl_3 + UCl_3 = 33.1$$

$$PuCl_3 = 25.9$$

$$UCl_3 = 7.2$$

Noting that the electrotransport step adds all the plutonium in the feed to the salt and removes the same amount of uranium from the salt, we can work backward to get the initial salt composition:

| $PuCl_3$ + 4.4 = 25.9 | $PuCl_3$ = 21.5 |
|---|---|
| $UCl_3$ − 4.4 = 7.2 | $UCl_3$ = 11.6 |

For the same amount of plutonium removed, the required initial salt compositions for several product compositions are given in Table 1. Table 2 shows the effect of an error in initial salt composition, assuming that 6.6 kilograms of uranium is used for the displacement reaction. All these values are calculated as shown below for the first entry in Table 2. We take x as the amount of plutonium in the final product.

$$PuCl_3 = 27.7 + 4.4 = 32.1$$

$$UCl_3 = 5.4 - 4.4 = 1$$

$$\left[\frac{32.1 - x}{1 + x}\right]\left[\frac{6.6 - x}{x}\right] = 1.8$$

$$X = 4.8 = Pu$$

$$U = 6.6 - 4.8 = 1.8$$

Here X is the amount of uranium in the product

TABLE 1

Required Initial Salt Composition for Several Product Compositions
(Constrained to Remove 4.4 kg of Pu Present in Feed)

| Product | | Salt | | |
| --- | --- | --- | --- | --- |
| Pu | U | $PuCl_3$ | $UCl_3$ | $PuCl_3/UCl_3$ |
| 4.4 kg | 4.4 kg | 16.9 kg Pu | 16.2 kg U | 1.0 |
| 4.4 kg | 2.2 kg | 21.5 kg Pu | 11.6 kg U | 1.9 |
| 4.4 kg | 1.1 kg | 24.7 kg Pu | 8.4 kg U | 2.9 |

TABLE 2

Product Obtained With Various Initial Salt Compositions
(6.6 kg U used for displacement)

| Product | | Salt | | |
| --- | --- | --- | --- | --- |
| Pu | U | $PuCl_3$ | $UCl_3$ | $PuCl_3/UCl_3$ |
| 4.8 kg | 1.8 kg | 27.7 kg Pu | 5.4 kg U | 5.1 |
| 4.4 kg | 2.2 kg | 21.5 kg Pu | 11.6 kg U | 1.9 |
| 2.7 kg | 3.9 kg | 16.6 kg Pu | 16.4 kg U | 1.0 |

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for separating uranium values and transuranic values from fission products containing rare earth values when said values are contained together in a molten chloride salt electrolyte comprising providing a molten salt electrolyte having a first ratio of plutonium chloride to uranium chloride, contacting said molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode causing the electrolyte to have a second ratio of plutonium chloride to uranium chloride, removing said solid cathode with the uranium metal deposited thereon and establishing chemical communication between said electrolyte having the second ratio and molten cadmium having uranium dissolved therein, and transferring plutonium values from the electrolyte to the molten cadmium and transferring uranium values from the molten cadmium to the electrolyte.

2. The process of claim 1, wherein the first ratio is greater than 1.

3. The process of claim 1, wherein the first ratio is less than the second ratio.

4. The process of claim 1, wherein the first ratio is about 2.

5. The process of claim 1, wherein the second ratio is greater than 3.

6. The process of claim 1, wherein the molten electrolyte is the eutectic of LiCl and KCl.

7. The process of claim 1, wherein the transfer of plutonium for uranium in the molten cadmium continues until the ratio of plutonium values to uranium values in the cadmium is about 2.

8. The process of claim 1, wherein the amount of uranium electrolytically deposited on the solid cathode is equal to the amount of uranium and plutonium transferred from the anode to the electrolyte.

9. The process of claim 8, wherein the amount of plutonium transferred to the molten cadmium is about twice the amount of uranium remaining in the molten cadmium.

10. A process for separating uranium values and transuranic values from fission products containing rare earth values when said values are contained together in a molten chloride salt electrolyte comprising providing a molten salt electrolyte having a first ratio of plutonium chloride to uranium chloride, contacting said molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode in an amount equal to the uranium and plutonium transferred from the anode causing the electrolyte to have a second ratio of plutonium chloride to uranium chloride, removing said solid cathode with the uranium metal deposited thereon and substituting therefor molten cadmium having uranium dissolved therein, and chemically transferring plutonium values from the electrolyte to the molten cadmium and transferring uranium values from the molten cadmium to the electrolyte until the first ratio o plutonium chloride to uranium chloride is reestablished.

11. The process of claim 10, wherein the electrolyte salt is a chloride mixture of alkali metals or alkaline earth metals other than beryllium and magnesium.

12. The process of claim 10, wherein said salt is essentially 56% potassium chloride and 44% lithium chloride.

13. The process of claim 10, wherein the amount of uranium and plutonium transferred to the molten salt electrolyte from the anode is substantially equal to the amount of uranium and plutonium remaining in the molten cadmium when the first ratio is reestablished.

14. The process of claim 13, wherein the second ratio divided by the first ratio equals the ratio of plutonium recovered from the molten cadmium divided by the uranium remaining in the molten cadmium after the first ratio is reestablished.

15. The process of claim 10, wherein the rare earth products are electrochemically transferred to the electrolyte and remain therein during transfer of plutonium and uranium values to the molten cadmium.

16. A process for separating uranium values and transuranic values from repeated batches of fission products containing rare earth values when said values are contained together in a molten chloride salt electrolyte comprising providing a molten salt electrolyte having a first ratio of plutonium chloride to uranium chloride, contacting said molten salt electrolyte with both a solid cathode and an anode having values of uranium and fission products including plutonium, electrolytically transferring uranium and plutonium from the anode to the electrolyte while uranium values in the electrolyte electrolytically deposit as uranium metal on the solid cathode in an amount equal to the uranium and plutonium transferred from the anode causing the electrolyte to have a second ratio of plutonium chloride to uranium chloride larger than said first ratio, removing said solid cathode with the uranium metal deposited thereon and dissolving some of the uranium metal in molten cadmium, contacting the molten cadmium with uranium values dissolved therein with said molten salt electrolyte having said second ratio, and chemically transferring plutonium values from the electrolyte to the molten cadmium and transferring uranium values from the molten cadmium to the electrolyte until the first ratio of plutonium chloride to uranium chloride is reestablished.

17. The process of claim 16, wherein the second ratio is at least twice the first ratio.

18. The process of claim 16, wherein the amount of plutonium transferred from the anode is substantially equal to the amount of plutonium dissolved in the molten cadmium.

19. The process of claim 16, wherein the amount of uranium transferred from the anode is substantially equal to the amount of uranium remaining in the molten cadmium after the first ratio is reestablished.

20. The process of claim 16, wherein the amount of uranium dissolved in the molten cadmium from the solid cathode is equal to the amount of plutonium and uranium remaining in the molten cadmium when the first ratio is reestablished.

* * * * *